United States Patent Office 3,155,587
Patented Nov. 3, 1964

3,155,587
STABLE LIQUID PREPARATIONS OF
7-CHLOROTETRACYCLINE
Charles C. Reed, Trenton, and Robert B. Fortenbaugh, Gladstone, N.J., assignors to American Cyanamid Company, Stamford, Conn., a corporation of Maine
No Drawing. Filed Jan. 23, 1963, Ser. No. 253,285
6 Claims. (Cl. 167—65)

This invention is concerned with novel liquid antibiotic compositions adapted for pharmaceutical use. More particularly, the invention is concerned with 7-chlorotetracycline solutions adapted for oral, parenteral and topical use. The solutions are remarkably stable at certain hydrogen ion concentrations, and are comprised of the antibiotic and a calcium salt dissolved in a polyhydric alcohol vehicle having an apparent pH of 7.5 to 10.0. The term apparent pH, as used in the specification, shall mean that pH reading obtained from substantially non-aqueous solutions such as those of the present invention, using glass and calomel electrodes.

It is well known that aqueous solutions of 7-chlorotetracycline are unstable. On the alkaline side, iso-7-chlorotetracycline forms while on the acid side, 7-chloro-anhydrotetracycline is produced. At a neutral pH, epimerization occurs. Hence, aqueous formulations of 7-chlorotetracycline are stable for only short periods of time and therefore 7-chlorotetracycline has been marketed heretofore either in the form of a suspension or in a solid form for reconstitution prior to use. While such modes of administration are adequate, they are quite inconvenient and, in addition, use under adverse circumstances provides opportunity for contamination as well as for error. Since stable solutions of 7-chlorotetracycline are highly desirable for use in veterinary medicine, solutions of 7-chlorotetracycline in various vehicles have been suggested in the past but none has been satisfactory from the standpoint of shelf stability.

We have found that solutions containing a substantial proportion (from 90% to 95% by weight) of a physiologically acceptable polyhydric alcohol as vehicle provide remarkably stable 7-chlorotetracycline solutions having relatively high concentrations of antibiotic when a certain proportion of a calcium salt and an apparent pH of from 7.5 to 10.0 are employed. It is thought that this remarkable stability advantage over other solutions is possibly due to the formation of a 7-chlorotetracycline-calcium complex. This complex is thought to have the composition of from 2 to 3 moles of calcium salt per mole of 7-chlorotetracycline. Some variation from this ratio is possible up to about equimolar amounts. Thus, the molar ratio of calcium salt to 7-chlorotetracycline may be 1:1, 2:1, 3:2, 3:1, 5:2, etc. Stable solutions could not be obtained using metals other than calcium, attempts were made to formulate stable solutions using magnesium, aluminum and zinc salts, the resultant solutions lost from 66 to 100% of initial potency after storage at room temperature for three months. The amount of organic base employed in adjusting the pH is an amount sufficient to adjust the apparent pH of the solution to a value of from 7.5 to 10.0, and preferably within the range of from 8.5 to 9.0.

Anions other than the chloride, that is calcium salts other than calcium chloride, may be employed. It is only necessary that the salt provide a clear solution and that, of course, the anion be physiologically acceptable, compatible in solution with the 7-chlorotetracycline, and stable at the pH of the composition. Satisfactory results are achieved by substituting the acetate, lactate, etc. for the chloride. By appropriate adjustment of the vehicle concentration, pH, and calcium salt-antibiotic ratio, the corresponding calcium salts may be substituted for calcium chloride.

Preferred organic bases for the purposes of the present invention are the β-aminoalkanols such as monoethanolamine and diethanolamine. However, other organic bases such as piperazine, morpholine, diethylamine, 1-aminopropanol-2, 1-amino-propanol-3 and diisopropanolamine may also be satisfactorily employed.

The specific solvents which have been discovered to be useful in the practice of the present invention are the polyhydric aliphatic alcohols and mixtures thereof. Especially satisfactory are glycerine, propylene glycol and the polyethylene glycols. The polyethylene glycols contemplated in the practice of the present invention consist of a mixture of non-volatile, normally liquid, polyethylene glycols which are soluble in both water and organic liquids and which have molecular weights of from about 200 to about 1500. Such mixtures are usually obtained by condensing glycol with ethylene oxide. Although various mixtures of the aforementioned non-volatile polyethylene glycols may be employed, it is preferred to use a mixture of non-volatile polyethylene glycols having an average molecular weight of from about 200 to about 400.

One of the difficulties encountered with liquid compositions of 7-chlorotetracycline is discoloration and loss of potency which appears to be due in part to oxidative degradation. This problem is particularly aggravated with aqueous solutions, but is also occasionally encountered with non-aqueous solutions. In order to avoid this difficulty, oxidizing conditions must be avoided during storage of the present product. As a practical matter it is convenient to employ antioxidants in addition to storing the product in an inert atmosphere. Satisfactory antioxidants are those which are physiologically acceptable for use in parenteral drug products and those which are, of course, compatible with 7-chlorotetracycline. Examples of suitable antioxidants include sodium bisulfite, sodium metabisulfite, and sodium formaldehyde sulfoxylate. Generally, from about 0.05% to about 0.2% concentrations of antioxidant are employed.

The novel compositions of the present invention are prepared by mixing 7-chlorotetracycline, preferably in the amphoteric form but alternatively as an acid addition salt, and the calcium salt in the polyhydric alcohol of approximately one-half of the final volume of vehicle to be employed. The apparent pH of the mixture is then adjusted to about 8.5 with an organic base as set forth above. The pH of the final composition is critical and the apparent pH must be within the range of from about 7.5 to about 10.0 in order to effect solution of all the components. Higher pH's also provide stable solutions but as the pH is increased above about 10.0, the physiological compatibility of the product with muscle tissue is decreased. The finished composition is obtained by then adding the remainder of the vehicle and the solution is sterilized, for instance, by filtration as a final stage of manufacture.

The use of an acid addition salt of the antibiotic such as the hydrochloride, the phosphate, the nitrate, etc. in preparing the present compositions is satisfactory. However, they require a larger amount of neutralizing agent with the accompanying formation of a larger quantity of the by-product acid addition salt of the neutralizing agent. This excess material performs no physiological function and, therefore, it is preferred to use the amphoteric antibiotic and keep the total concentration of the salts in the solution to a minimum.

The preferred concentration of 7-chlorotetracycline is 25 to 50 mg./ml. of the finished compositions when intramuscular injection is the purpose for which the compositions are intended. They are equally adapted to intravenous administration when diluted with water or diluents employed in intravenous therapy such as isotonic glucose in appropriate quantities. For this use, initial concentrations down to about 10 to 25 mg./ml. of the antibiotic are satisfactory. They are also adapted to oral administration when diluted with drinking water.

Other ingredients commonly employed in parenteral formulations may also be incorporated in the novel liquid antibiotic compositions of the present invention. Examples of these are other antibiotics like streptomycin, polymixin B sulfate, and oleandomycin; sulfonamides like sulfaethoxypyridazine and sulfamethoxypyridazine; and steroid hormones like cortisone and hydrocortisone.

The novel 7-chlorotetracycline-calcium salt solutions of the present invention are particularly advantageous because of their remarkable stability over long periods of time and under varying atmospheric conditions. Their value extends not only to humans but especially to the treatment of cattle, sheep, goats, hogs, horses, poultry, house pets and other animals. Compared to the 7-chlorotetracycline solutions and suspensions heretofore available, their stability and shelf life are outstanding. They are not subject to deterioration, hence their potency remains essentially constant. The dosage of the present compositions is adjusted to provide about 2 mg. to about 10 mg. of 7-chlorotetracycline activity per day per kilogram of body weight. Similar or reduced doses may be employed in the treatment of small animals. Intramuscular injections are limited in volume to from 2 to 4 ml. Thus the entire daily dose can be administered in one or two injections.

The following examples are provided for illustrative purposes and may include particular features of the invention. However, the examples should not be construed as limiting the invention, many variations of which are possible without departing from the spirit or scope thereof.

EXAMPLE 1

In 70 ml. of propylene glycol was dissolved 2.5 g. (0.005 mole) of 7-chlorotetracycline base and 1.1 g. (0.01 mole) of anhydrous calcium chloride. The pH of the solution was adjusted to an apparent value of 9.1 by the addition of 1.2 ml. of monoethanolamine. The initial assay of the resulting solution was 29.0 mg./ml. of antibiotic. After 9 months at 37° C., the assay was 25.0 mg./ml., representing a loss in potency of only 12.3% from the initial assay. After 6 weeks at 56° C., the assay was still 25.0 mg./ml. A loss in potency of only 12.3% at these elevated temperatures clearly demonstrates the stability of the novel compositions of the present invention.

EXAMPLE 2

In 100 ml. of polyethylene glycol 400 was dissolved 2.5 g. (0.005 mole) of 7-chlorotetracycline base and 1.1 g. (0.01 mole) of anhydrous calcium chloride. The pH of the solution was adjusted to an apparent value of 9.1 by the addition of 0.9 ml. of monoethanolamine. The initial assay of the resulting solution was 26.8 mg./ml. of antibiotic. After one year at room temperature, the assay was 23.0 mg./ml. representing a loss in potency of only 14.0% from the initial assay. After 9 months at 37° C. the assay was 23.3 mg./ml. representing a loss in potency of only 13%. After 6 weeks at 56° C. the assay was also 23.3 mg./ml.

EXAMPLE 3

In 70 ml. of propylene glycol was dissolved 2.5 g. (0.005 mole) of 7-chlorotetracycline base and 1.1 g. (0.01 mole) of anhydrous calcium chloride. To the resulting solution was added 7.5 g. of carbamazine base and sufficient piperazine base to give an apparent pH of 8.9. The initial assay of the resulting solution was 25.0 mg./ml. of antibiotic. After 6 months at room temperature, the assay showed no loss in potency. After 6 months at 37° C., the assay was 24.0 mg./ml. representing only a 4% loss in potency.

EXAMPLE 4

In 70 ml. of propylene glycol was dissolved 2.5 g. (0.005 mole) of 7-chlorotetracycline base, 1.1 g. (0.01 mole) of anhydrous calcium chloride, and 7.0 g. of sulfamethoxypyridazine. The solution was then adjusted to an apparent pH of 8.9 by the addition of approximately 1.0 ml. of monoethanolamine. The initial assay of the resulting solution was 27.5 mg./ml. of antibiotic. After 6 months at room temperature, the assay showed no loss in potency.

EXAMPLE 5

This example demonstrates the stability of compositions comprising solutions of the present invention and Neomycin. This example further demonstrates the effectiveness of the aforementioned composition on conditions of mastitis.

A composition containing the following ingredients was prepared:

| | | |
|---|---|---|
| Chlorotetracycline | g | 6.0 |
| Calcium chloride anhydrous | g | 1.39 |
| Ethylene diamine to pH 8.5 approx. | ml | 0.84 |
| Sodium sulfite | mg | 200 |
| Neomycin sulfate | g | 1.84 |
| Myverol (Type 18–00) | g | 1.0 |
| Deionized water | ml | 15.0 |
| Polyethylene Glycol 400 | ml | 110 |

Procedure:

(a) Chlorotetracycline neutral, 6.0 g., is suspended in 50 ml. of PEG 400 and heated to 60° C. with stirring to effect solution.

(b) PEG 400, 46 ml., was warmed to 130° C. and 1.39 g. of anhydrous calcium chloride was added, the mixture was stirred until solution was achieved. This solution was added to the solution prepared in step a and with stirring 0.84 ml. of ethylene diamine was added. After the expiration of 4 minutes 100 mg. of finely ground sodium sulfite was added, the batch was then heated to 80° C. and filtered through No. 3 filter paper.

(c) A 150 ml. beaker was charged with 15 ml. of deionized water and 64 ml. of the filtrate from step b. Then 100 mg. of sodium sulfite and 1.0 g. of Myverol—Type 18–00 were added and the batch was heated to 70° C. with stirring.

(d) The batch was cooled to 35° C. and a paste of 14 ml. of PEG 400 containing 1.84 g. of neomycin sulfate was added and thoroughly mixed.

Samples of the aforementioned formulation were then subjected to stability studies and were stored at 25° C. for 3 months. The results of the stability study are set forth in the following table, and show that at the end of 3 months' storage at 25° C. the preparation had retained 94.3% of its chlorotetracycline potency and 95.3% of its neomycin potency.

| Months at 25° C. | Chlorotetracycline Potency, mg./6 ml. | Neomycin Potency, mg./6 ml. |
|---|---|---|
| Initial _____ mg ____ | 210 | 107 |
| 3 _____ mg ____ | 198 | 102 |

Preparations of the aforementioned formulation were prepared in the manner set forth hereinabove, and were administered to 115 cows afflicted with mastitis. After the administration of two intramammary infusions approximately 80% of the infection showed clinical recovery. The milk from these cows was examined bacteriologically, and 70% were found to be negative to the organisms which were originally isolated from the infected udder.

EXAMPLE 6

This example demonstrates the stability of solutions of the present invention to which sulfamethoxy-pyridazine (Kynex) was added.

A composition containing the following ingredients was prepared.

| | |
|---|---|
| Calcium chloride anhydrous, 0.01 mole_____g__ | 1.1 |
| Propylene glycol _____ml__ | 70 |
| Sulfamethoxypyridazine (Kynex) _____g__ | 7.0 |
| Chlorotetracycline, 0.005 mole _____g__ | 2.5 |
| Monoethanolamine to pH 8.9 approx. _____ml__ | 2.5 |

The calcium chloride and the Kynex were dissolved in the propylene glycol by warming to 70° C. The solution was then cooled to room temperature (R.T.) and adjusted to a pH of 8.9 with monoethanolamine, warmed to 70° C. and cooled to room temperature (R.T.). Chlorotetracycline was added and dissolved by stirring. The pH was readjusted to 8.9 and the solution was filtered through a medium cintered glass funnel. Samples of the preparation were then subjected to stability studies. The results of the stability studies are tabulated hereinbelow:

| Time | Temperature, ° C. | Microbiological Potency, mg./ml. | Percentage Loss of Initial Potency |
|---|---|---|---|
| Initial | R.T. | 27.5 | |
| 6 months | R.T. | 30.0 | |
| 12 months | R.T. | 24.8 | 10 |
| 24 months | R.T. | 25.5 | 7 |
| 6 months | 37 | 30.0 | |
| 6 weeks | 56 | 24.8 | 10 |

The aforementioned procedure was again followed using the same formulation, but substituting for chlorotetracycline neutral, chlorotetracycline HCl. The results of the stability study show that at the end of 15 months' storage at room temperature the preparation had retained 84% of its initial microbiological potency.

EXAMPLE 7

This example demonstrates the instability of polyhydric alcohol solutions of chlorotetracycline and metal salts of magnesium, aluminum and zinc.

A composition containing the following ingredients was prepared:

| | |
|---|---|
| Magnesium chloride _____g__ | 1.066 |
| Propylene glycol _____ml__ | 70 |
| Chlorotetracycline _____g__ | 2.5 |
| Monoethanolamine to pH 9.0 approx. _____ml__ | 1.2 |

A solution was prepared in the manner set forth hereinabove and samples of the solution were subjected to stability studies. The results of the stability studies are tabulated hereinbelow:

*Table I*

| Time | Temperature, ° C. | Microbiological Potency, mg./ml. | Percentage Loss of Initial Potency |
|---|---|---|---|
| Initial | R.T. | 29.5 | |
| 3 months | R.T. | 10.0 | 66 |
| 3 months | 37 | 5.3 | 82 |

The aforementioned procedure was again followed using the same formulation, but substituting for magnesium chloride, aluminum chloride hexahydrate; and samples of the solution were subjected to stability studies. The results of the stability studies are tabulated hereinbelow:

*Table II*

| Time | Temperature, ° C. | Microbiological Potency, mg./ml. | Percentage Loss of Initial Potency |
|---|---|---|---|
| Initial | R.T. | 32.0 | |
| 3 months | R.T. | 4.1 | 87 |
| 3 months | 37 | 1.9 | 94 |

The aforementioned procedure was again followed using the same formulation, but substituting for magnesium chloride, zinc chloride; and samples of the solution were subjected to stability studies. The results of the stability studies are tabulated hereinbelow:

*Table III*

| Time | Temperature, ° C. | Microbiological Potency, mg./ml. | Percentage Loss of Initial Potency |
|---|---|---|---|
| Initial | R.T. | 25.8 | |
| 3 months | R.T. | Negative | 100 |
| 3 months | 37 | Negative | 100 |

This application is in part a continuation of our co-pending application, Serial No. 165,959, filed January 12, 1962, now abandoned.

What is claimed is:

1. A stable liquid antibiotic composition adapted for pharmaceutical use comprising, as a vehicle, from 90% to 95% by weight of a physiologically acceptable polyhydric alcohol and dissolved in said vehicle from 10 to 50 mg./ml. of a substance selected from the group consisting of 7-chlorotetracycline and an acid addition salt thereof, from 1 to 3 molar equivalents of a water-soluble, physiologically acceptable calcium salt per mole of 7-chlorotetracycline having an apparent pH of 7.5 to 10.0.

2. A composition according to claim 1 wherein the polyhydric alcohol is propylene glycol.

3. A composition according to claim 1 wherein the calcium salt is calcium chloride.

4. A composition according to claim 1 containing a water soluble, physiologically acceptable organic base.

5. A composition according to claim 4 wherein the organic base is monoethanolamine.

6. A composition according to claim 1 having dissolved therein from 0% to 15% by weight of water.

References Cited in the file of this patent

UNITED STATES PATENTS

| | | |
|---|---|---|
| 2,878,289 | McCormick et al. | Mar. 17, 1959 |
| 2,903,395 | Salivar | Sept. 8, 1959 |
| 2,976,213 | Murphey | Mar. 21, 1961 |
| 2,984,686 | Blackwood et al. | May 16, 1961 |
| 3,005,754 | Granatek | Oct. 24, 1961 |
| 3,009,956 | Noseworthy et al. | Nov. 21, 1961 |
| 3,017,323 | Gordon et al. | Jan. 16, 1962 |
| 3,026,248 | Noseworthy et al. | Mar. 20, 1962 |
| 3,043,875 | Beereboom et al. | July 10, 1962 |
| 3,053,892 | Sieger et al. | Sept. 11, 1962 |
| 3,068,264 | Sieger et al. | Dec. 11, 1962 |